UNITED STATES PATENT OFFICE.

HEINRICH GOSLAR, OF AACHEN, GERMANY.

PROCESS OF CONSERVING ORGANIC SUBSTANCES.

1,138,602. Specification of Letters Patent. Patented May 4, 1915.

No Drawing. Application filed August 6, 1914. Serial No. 855,347.

*To all whom it may concern:*

Be it known that I, HEINRICH GOSLAR, veterinary surgeon, a subject of the King of Prussia, residing at No. 22 Theresienstrasse, Aachen, in the Kingdom of Prussia, Empire of Germany, have invented certain new and useful Improvements in Processes of Conserving Organic Substances; and I do hereby declare the following to be a full, clear, and exact description of the invention, such as will enable others skilled in the art to which it appertains to make and use the same.

The organic substances to be treated by the present process are flesh, blood, animal glands and the juices thereof, and the juices of fruits and vegetables.

The organic substances contain, beside the components which are especially considered as nutritive stuffs such as albumen, fat and hydrates of carbon, other exceedingly valuable stuffs such as nutritive salts, ferments, enzyms, hormons and the like. These latter stuffs are of great importance for the processes of life in the animal body; on the one hand they directly influence the proper decomposition and utilization of the nutritious stuffs (albumen, fat and hydrates of carbon) themselves, on the other hand they have a beneficial influence on the operation of the several organs of the body. The value of these stuffs is the higher the less their original composition is changed by any circumstances. Such circumstances are especially chemical and thermal coöperations with temperatures higher than that of the body or the blood, respectively, such as form the basis in most of the well-known processes for the conservation of organic substances. Through these chemical and thermal coöperations the original composition of the said components, which are contained in the organic substances of vegetable and animal kind and which, in dietetic and therapeutic respect, are essentially valuable for the processes of life in the body, is very much changed and their value injuriously influenced.

The object of my present invention is a process for transferring into a durable form these dietetically and therapeutically operative stuffs—such as nutritive salts, ferments, enzyms, hormons, etc.—alone or together with the organic substances of vegetable or animal kind in which they are contained, and keeping at the same time these stuffs as near their original composition as possible.

The process consists in adding to the organic substances to be conserved fibrin- and gluten-containing stuffs in a finely crushed condition and drying the mixture at the lowest possible temperature; the process is based on the fact that a mixture of fibrin-containing and gluten-containing stuffs obtains, when dried even at low temperatures, a horny and exceedingly durable condition. As the drying takes place at low temperatures, no change occurs in the organic stuffs to be conserved.

The fibrin may be employed in the form of finely crushed fibrin-containing animal webs, preferably such as fibrin-containing parts of the blood and fibrin-containing organs, and the gluten in the form of grain.

If it is desired for example to conserve the dietetically and therapeutically effective stuffs such as nutritive salts, ferments, enzyms, hormons and the like, the process will be carried out as follows. The organic substances which contain the afore-mentioned stuffs are, if they are rich in juice, pressed in order to obtain the juice in which the stuffs to be conserved are chiefly contained. If the substances contained only little water, they are crushed in water and then pressed out, or an aqueous extract is made from them. The juice thus obtained is added to a mixture of gluten-forming grain-flour and of fibrin-containing webs, such as coagulum of blood or fibrin-containing organs. After the whole mixture has been thoroughly mixed, it is subjected to an intensive grinding or kneading and pressing. The mass thus prepared is, in accordance with its contents of water, worked into an unguentary paste which in turn is expanded in thin sheets, or by means of suitable mechanical devices formed into small plates or grooved longitudinal nodules which offer a large surface. The thinly extended unguentary paste or the small plates and nodules are then subjected to an air-current of suitable strength and of a temperature of not more than 104° Fahrenheit. Under the influence of this air-current the mixture formed in the manner described turns into a horny, exceedingly durable condition. In this hardened condition, the dried product allows of a very far-going mechanical disruption by means of suitable milling devices in such a manner that the several parts of the product are rolled and ground as finely as possible, this being of special importance for the digestion of the starch-flour- and cellulose-containing ingredients of the product.

By successively impregnating the product several times and thereafter drying and grinding the same, such a fine mechanical disruption of the starch-flour and cellulose-containing ingredients is obtained as cannot be effected by the well-known ordinary grinding of the ingredients of the grain. The perfect disruption of the ingredients mentioned is not only of importance for the digestion of these stuffs, but it is also of importance for their durability which is dependent upon the intensiveness of impregnating with fibrin and gluten those parts which serve as bearer for the substances to be conserved. The organic substances may also as a whole be brought into a durable form in the same manner as the juices and extracts taken from the organic stuffs. In such case, the organic substances are ground as finely as possible, and if these substances themselves contain enough fibrin (muscle flesh, animal organs, blood and the like), glutten-forming grain-flour is directly added to the same; the mixture is thereupon further prepared in the manner already indicated. If, however, the stuffs to be conserved, such as vegetable stuffs for example, do not contain any or only little fibrin, these stuffs are added to a mixture of finely divided fibrin-containing animal substances and gluten-forming grain-flour. In case moisture should be wanted during the action of mixing, distilled water may be added. For cleaning the surfaces of the organic substances to be prepared hydrogen peroxid may be used. Stuffs which are easily decomposable are kept cool in a suitable manner until their preparation, in order to prevent the development of schizomysetes. It is therefore apparent that by the present process a product can be obtained which is highly durable and easily digestible at the same time.

The above-described transference of organic substances into a durable condition, which is relatively simple to effect and which takes place so as to maintain the nativity of their components without the use of temperatures higher than the temperature of the body and without the application of chemical additions, is based on the fact that, when thoroughly mixing the gluten- and fibrin-containing moist stuffs and thereupon grinding, kneading and pressing the same, the gluten which in its original form was already contained in the grain-flour, is produced. During the further continuous grinding kneading and pressing the starch-flour- and cellulose-containing stuffs are, as so-called bearers of the substances to be conserved, impregnated with the gluten as well as with the fibrin. In consequence of the rapid extraction of water effected by means of a heated air-current of low temperature the mixture of the gluten and fibrin and together with this mixture the organic stuffs impregnated with the same are brought into a very hard, horny condition. A low temperature (temperature of the body) is sufficient in order to produce this horny condition, as on account of the rapid extraction of the water the gluten and the fibrin while otherwise easily decomposable, turn into a durable form already at low temperatures. The extraction of moisture prevents a progressive development of any schizomysetes which might be contained in the mass. The schizomysetes are kept in place in the mass, when this during the drying becomes horny, and their growth will be checked from lack of moisture or they even perish.

Having thus described my invention, what I claim is:

1. A process for conserving flesh, blood, animal glands and the juices thereof, and the juices of fruit and vegetable and simultaneously maintaining the nativity of their ingredients, which consists in thoroughly mixing finely divided fibrin-containing webs and gluten-containing grain-flour, adding to this mixture the organic substances, and then forming the whole mass thus prepared into thin sheets and quickly drying the mass in this condition at a low temperature.

2. That process of conserving flesh, blood, and animal glands and the juices thereof, and the juices of fruit and vegetables and simultaneously maintaining the nativity of their ingredients which consists in mixing finely divided fibrin and gluten-containing substances with the organic substances to be conserved, in the presence of moisture rolling the mass into thin sheets, and quickly drying the sheets at a low temperature.

In testimony whereof I have signed my name to this specification in the presence of two subscribing witnesses.

HEINRICH GOSLAR.

Witnesses:
P. H. TREES,
D. OLEO FISHER.